Feb. 14, 1950 — H. W. DARR — 2,497,813
PORTABLE PRESSURE FLUID SERVOMOTOR AND VALVE THEREFOR
Filed April 17, 1946 — 2 Sheets-Sheet 1
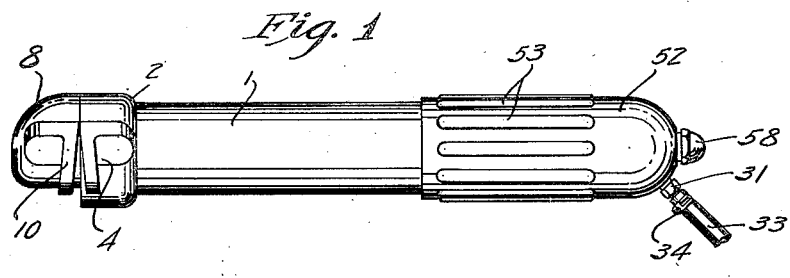
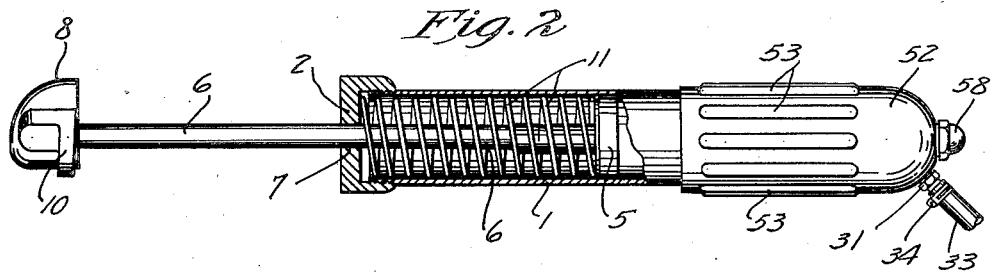
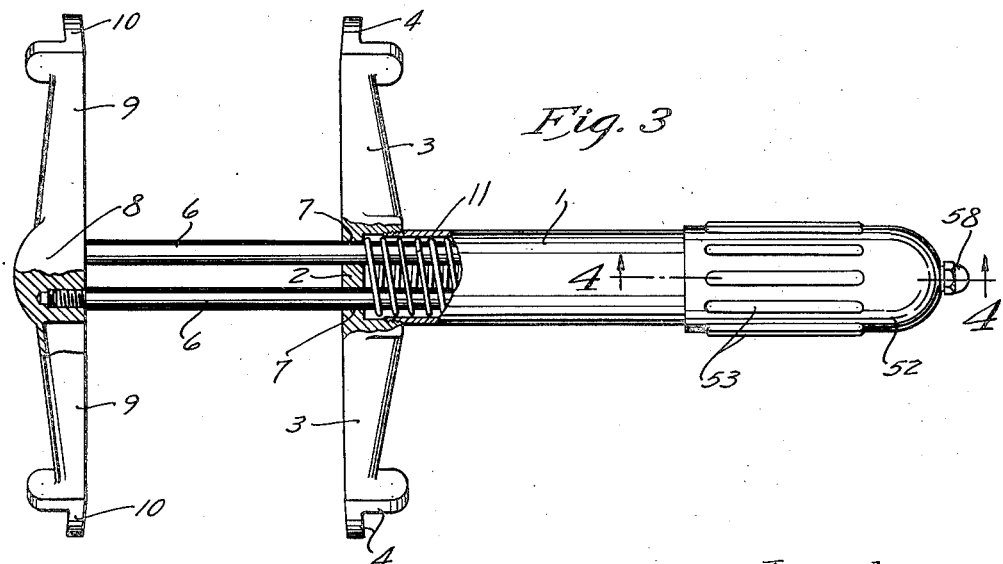
Inventor
Harold W. Darr
By his Attorneys
Merchant & Merchant

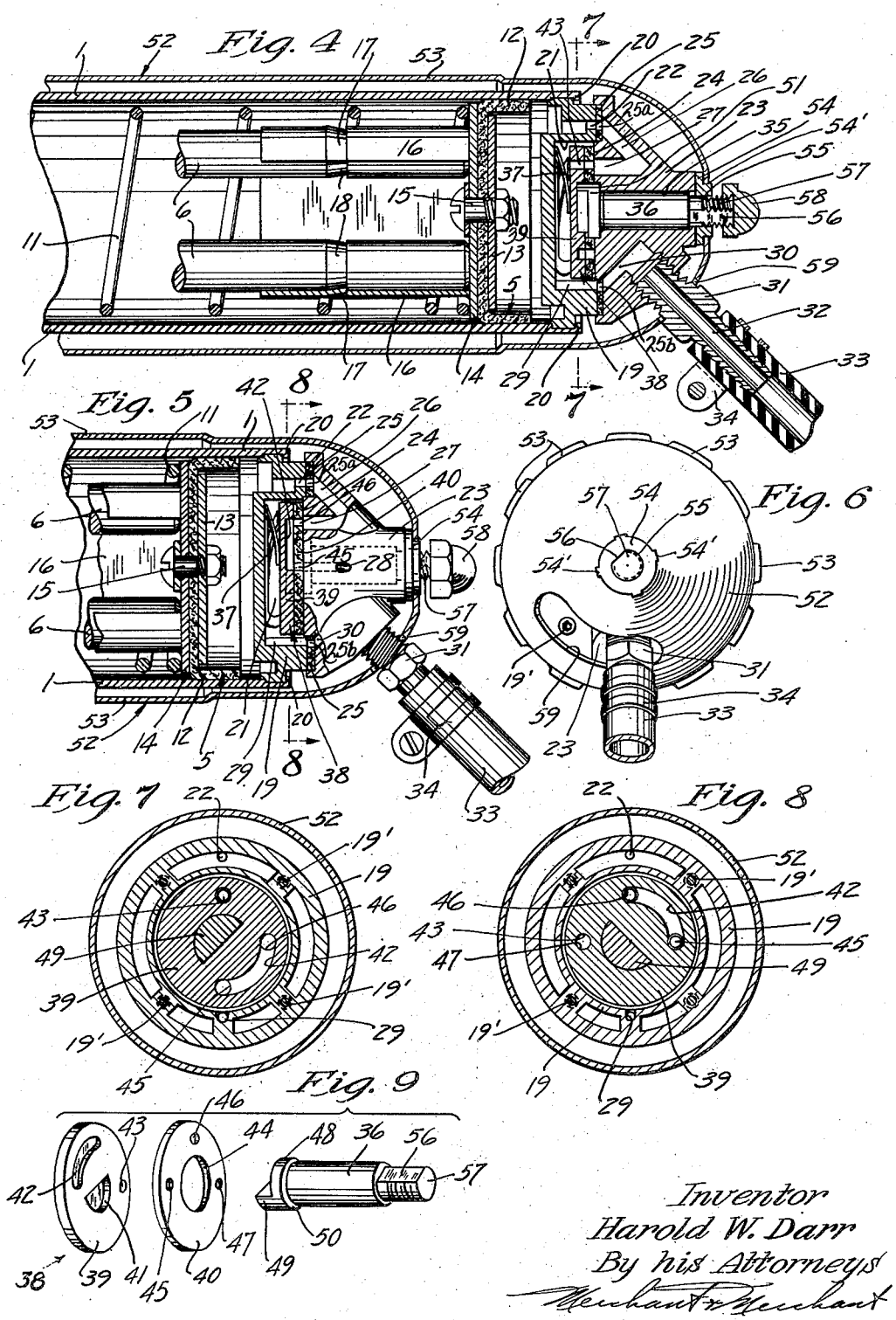

Patented Feb. 14, 1950

2,497,813

UNITED STATES PATENT OFFICE 2,497,813

PORTABLE PRESSURE FLUID SERVOMOTOR AND VALVE THEREFOR

Harold W. Darr, Minneapolis, Minn., assignor to Char-Lynn Co., Minneapolis, Minn., a corporation of Minnesota Application April 17, 1946, Serial No. 662,810

5 Claims. (Cl. 121—38)

My invention relates to tire spreading or inspecting devices, and has for its primary object the provision of a novel valve mechanism for manipulating the same.

Another object of my invention is the provision of a novel handle mechanism for cooperation with the operating valve.

The above and still further objects of my invention will become apparent from the following detailed specification, appended claims, and attached drawings.

Referring to the drawings, in which like characters indicate like parts throughout the several views:

Fig. 1 is a side elevation of the spreader, showing the same in a closed position;

Fig. 2 is a view corresponding to Fig. 1, but with some parts broken away and shown in section, illustrating the spreader in a tire spreading or expanded position;

Fig. 3 is a plan view, with some parts broken away and shown in section, of the device shown in Fig. 2;

Fig. 4 is an enlarged fragmentary section taken substantially on line 4—4 of Fig. 3;

Fig. 5 is a view substantially corresponding to Fig. 4, but showing a different position of some of the parts;

Fig. 6 is an end elevation as seen from the right of Fig. 5;

Fig. 7 is a view in cross section taken on the line 7—7 of Fig. 4;

Fig. 8 is a similar view taken on the line 8—8 of Fig. 5; and

Fig. 9 is a composite perspective view of some of the valve parts of the spreader.

Referring with greater particularity to the drawings, the numeral 1 indicates a tubular cylinder which is closed at one end by a cap 2 having screw-threaded engagement therewith. Cap 2 has a pair of diametrically opposed arms 3 which terminate in work-engaging members in the nature of tire bead-engaging jaws 4. Within the cylinder 1 is a suitable piston 5 which is connected to a pair of piston rods 6 which extend axially of the cylinder 1 and project through openings 7 in the cap 2. At their extreme outer ends, piston rods 6 are connected to the hub 8 of a pair of oppositely projecting arms 9 carrying at their ends work-engaging members in the nature of tire bead-engaging jaws 10, which are in alignment with the similar tire bead-engaging jaws 4 carried by the arms 3. Interposed between piston 5 and the cap 2 is a coil compression spring 11 yieldingly biasing the piston 5 to position the jaws as shown in Fig. 1.

Piston 5, as shown particularly in Figs. 4 and 5, is made up of a cup of leather or like material 12 and a pair of washers 13 and 14 on the inside and the outside respectively of the cup 12, and is clamped together by a nut-equipped screw 15. Welded or otherwise secured to the washer 14 is a clip 16. Ears 17 formed in the clip 16 engage peripheral detents 18 in the piston rods 6 to secure the piston rods 6 in close contact with the washer 14. By this simple means, the piston rods are securely held to the piston 5. It will be noted that in Figs. 4 and 5, the piston rods 6 and the piston 5 with parts carried thereby have been rotated 90° for convenience in illustrating the several parts.

The cylinder 1 at the end opposite the cap 2 is provided with a cylinder head 19. The cylinder head 19 may be secured by any means, but as shown is pressed into the end of the cylinder 1 against a shoulder therein and the extreme end of the cylinder 1 is peened as at 20 to securely hold the head in place. An air tight seal between the cylinder 1 and the cylinder head 19 may be affected by soldering or any suitable means.

As shown particularly in Figs. 4 and 5, cylinder head 19 is provided with an axial recess 21 and an air passage 22 which is radially spaced from the recess 21 and extends axially through said cylinder head.

Secured to the outer side of the cylinder head 19 by cap screws 19' is a valve cap 23 having an annular raised central portion at its inner end which forms a valve seat 24. A gasket 25 interposed between the valve cap 23 and the cylinder head 19 forms an air tight seal between the valve cap and the head. A passage 26 in valve cap 23 extends from a point in alignment with the passage 22 in cylinder head 19, through an opening 25a in the gasket 25 to a port 27 in the valve seat. A port 28 extends from the valve seat 24 axially through valve cap 23 to atmosphere. The recess 21 forms an air passage intermediate the disc 38 and the cylinder head 19 is peripherally notched out at one side to form an axially extended air passage 29 and communicates with a passage 30 extending through the valve cap 23 and through the gasket 25 at 25b. A nipple 31 has threaded engagement with the cap 23 and has a passage 32 therethrough communicating with the passage 30 of the valve cap 23. A hose 33 suitably clamped to the nipple 31 as at 34 connects the entire device to a source of air pressure, not shown. A central or axial opening 35 through the valve cap 23 forms a bearing for a valve stem 36, the purpose of which will be hereinafter described.

Held against the valve seat 24 by a compression spring 37 in the recess 21, is a valve disc indicated in its entirety by 38. As shown particularly in Figs. 4, 5, and 9, valve disc 38 comprises a back plate 39 made of relatively hard material and a face plate 40 of leather or other suitable soft material. Back plate 39 is provided at its center with a D-shaped recess 41, a circumferentially extending channel 42 which is radially outwardly spaced from recess 41, and an opening 43 which extends axially through said plate 39. Face plate 40 is provided with a central opening 44 and three circumferentially-spaced openings 45, 46, and 47. The plates 39 and 40 are cemented together to form an integral unit, the holes 45 and 46 of plate 40 overlying the opposite ends of the circumferential channel 42 and the hole 47 of plate 40 being in alignment with the hole 43 of plate 39.

As shown particularly in Figs. 4, 7, 8, and 9, the valve stem 36 is provided at its inner end with a head 48 which is adapted to pass through the opening 44 in the plate 40, and which head is formed at its extreme end with a key in the nature of a D-shaped projection 49 which fits the recess 41 of the plate 39. Shoulder 50 on head 48 and shoulder 51 on the valve cap 23 abut to limit outward movements of the stem 36 relative to the cap 23.

For rotating the valve disc 38 by means of the stem 36, I provide a tubular handle 52 which extends over a portion of the cylinder 1, is concentric thereto, and is provided on a portion of its periphery with circumferentially-spaced ribs 53 and at its extreme end with a bushing 54. Bushing 54 may be peened or otherwise secured as at 54' for rotation with said handle. The bushing 54 is provided with a D-shaped hole 55, the flat side of which engages a flattened surface 56 of an extended threaded portion 57 of the stem 36. A cap nut 58 limits endwise movements of the tubular handle 52 with respect to the cylinder 1 and parts carried thereby.

Located radially outwardly of the bushing 54 in the handle 52 is a circumferential slot 59 through which nipple 31 extends. The nipple 31 and the opposite ends of the slot 59 cooperate to limit rotary movements of the tubular handle 52 and thereby the movements of the valve stem 36 and the valve disc 38.

Operation

Normally or in inoperative position, the jaws 4 and 10 are closed, as indicated in Fig. 1. When the jaws are in this closed position, the valve mechanism will be in the position indicated in Fig. 5, so as to allow the air inside of the cylinder 1 to be discharged therefrom through openings 22 and 25a in the head 19 and the gasket 25 respectively, through passage 26 in cap 23, through opening 27 in valve seat 24, through opening 46 in plate 40, through channel 42 in plate 39, out through openings 45 in plate 40, and to atmosphere through passage 28 in cap 23.

When it is desired to spread the jaws to the position indicated in Fig. 2, for the purpose of spreading the opposite beads of a tire apart for inspection or the like, the handle 52 is turned in a clockwise direction to the position shown in Fig. 6, where nipple 31 and segmental slot 59 cooperate to limit the rotation of the handle 52. In this position, the valve disc 38 is disposed as shown in Figs. 4 and 7, and wherein the air under pressure entering cap 23 through passage 32 in nipple 31 passes through the passage 30, through the opening 25a in the gasket 25, through axially extended passage 29 behind the valve disc 38, through the aligned openings 43 and 47 in the valve disc, through opening 27 in passage 26 in the valve seat 24 and valve cap 23 respectively, through passage 22 in cylinder head 19, to the interior of cylinder 1. In this position, the holes 45 and 46 connected by the channel 42 are rendered inoperative by engagement with the imperforate surface of valve seat 24.

The above disclosed structure has gone into widespread commercial use and has been found extremely useful and practical for the purpose intended.

While I have disclosed a preferred embodiment of my invention as required by Sec. 4888 of the United States Revised Statutes, it should be obvious that the invention is subject to considerable modification within the scope of the appended claims.

What I claim is:

1. In a device of the class described, a cylinder, a piston within said cylinder, a cylinder head, an axial recess in said cylinder head, an air passage extending through said head radially outwardly of said recess, a valve disc mounted for rotation in said recess, said disc on its outer face having three circumferentially-spaced openings, two adjacent ones of which extend but partially through said disc and are connected to each other within said disc, and a third of which openings extends axially through said disc, a valve cap secured to said cylinder head and having an axial opening therethrough, a valve stem journalled in the axial opening of said cap and keyed to said disc, an air passage intermediate said valve disc and head in constant communication with the opening through said disc and terminating in said head radially outwardly of said disc, a valve seat on the inner face of said valve cap cooperating with said valve disc, a port in said valve seat adapted to be aligned with the openings in the valve disc upon rotation of the valve disc and discharging to atmosphere, a port in said valve seat adapted to be axially aligned with the openings in said valve disc upon rotation of said valve disc and communicating with the air passage in said cylinder head, an air passage in said valve cap communicating with the air passage intermediate said valve disc and cylinder head and adapted to be connected to a source of air pressure, and means for rotating said valve stem, said valve disc comprising a back plate of relatively hard material and a face plate of relatively soft material, said back plate having a circumferentially-extending channel adjacent said face plate and an opening circumferentially-spaced from said channel and extending axially through said back plate, said face plate having three circumferentially-spaced openings extending axially therethrough, one of said openings being aligned with the opening through said back plate and the other two of which communicate with opposite ends of said channel.

2. In a device of the class described, a cylinder, a piston within said cylinder, a cylinder head, an axial recess in said cylinder head, an air passage extending through said head radially outwardly of said recess, a valve disc mounted for rotation in said recess, said disc on its outer face having three circumferentially-spaced openings, two adjacent ones of which extend but partially through said disc and are connected to each other within said disc, and a third of which openings extends axially through said disc, a valve cap secured to said cylinder head and having an axial opening therethrough, a valve stem journalled in the axial opening of said cap and keyed to said disc, an air passage intermediate said valve disc and head in constant communication with the opening through said disc and terminating in said head radially outwardly of said disc, a valve seat on the inner face of said valve cap cooperating with said valve disc, a port in said valve seat adapted to be aligned with the openings in the valve disc upon rotation of the valve disc and discharging to atmosphere, a port in said valve seat adapted to be axially aligned with the openings in said valve disc upon rotation of said valve disc and communicating with the air passage in said cylinder head, an air passage in said valve cap communicating with the air passage intermediate said valve disc and cylinder head and adapted to be connected to a source of air pressure, and means for rotating said valve stem, said means for rotating said valve stem being in the nature of a tubular handle secured to said valve stem for rotation therewith and extending longitudinally over a portion of said cylinder concentric therewith.

3. In a device of the class described, a cylinder, a piston within said cylinder, a cylinder head, an axial recess in said cylinder head, an air passage extending through said head radially outwardly of said recess, a valve disc mounted for rotation in said recess, said disc on its outer face having three circumferentially-spaced openings, two adjacent ones of which extend but partially through said disc and are connected to each other within said disc, and the third of which openings extends through said disc, a valve cap secured to said cylinder head and having an axial opening therethrough, a valve stem journalled in the axial opening of said cap and keyed to said valve disc, an air passage intermediate said valve disc and said head in constant communication with the opening through said disc and terminating in said head radially outwardly of said disc, a valve seat on the inner face of said valve head cooperating with said valve disc, a port in said valve seat adapted to be aligned with the openings in the valve disc upon rotation of the valve disc and discharging to atmosphere, a port in said valve seat adapted to be axially aligned with the opening in said valve disc upon rotation of said valve disc and communicating with the air passage in said cylinder head, an air passage in said valve cap communicating with the air passage behind said valve disc and adapted to be connected to a source of air pressure, a tubular handle secured to said valve stem for rotation therewith and extending longitudinally over a portion of said cylinder concentric therewith, a segmental slot in said tubular handle, a nipple secured to said valve cap and extending through said slot, said nipple communicating with the air chamber behind said piston, and said nipple and slot cooperating to limit rotation of said valve stem.

4. In a device of the class described, a cylinder, a piston within said cylinder, a cylinder head, an axial recess in said cylinder head, an air passage extending through said head radially outwardly of said recess, a valve disc mounted for rotation in said recess, said disc on its outer face having three circumferentially-spaced openings, two adjacent ones of which extend but partially through said disc and are connected to each other within said disc, and the third of which openings extends through said disc, a valve cap secured to said cylinder head and having an axial opening therethrough, a valve stem journalled in the axial opening of said cap and keyed to said valve disc, an air passage intermediate said valve disc and said head in constant communication with the opening through said disc and terminating in said head radially outwardly of said disc, a valve seat on the inner face of said valve head cooperating with said valve disc, a port in said valve seat adapted to be aligned with the openings in the valve disc upon rotation of the valve disc and discharging to atmosphere, a port in said valve seat adapted to be axially aligned with the opening in said valve disc upon rotation of said valve disc and communicating with the air passage in said cylinder head, an air passage in said valve cap communicating with the air passage behind said valve disc and adapted to be connected to a source of air pressure, a tubular handle secured to said valve stem for rotation therewith and extending longtudinally over a portion of said cylinder concentric therewith, a segmental slot in said tubular handle, a nipple secured to said valve cap and extending through said slot, said nipple communicating with the air chamber behind said piston, and said nipple and slot cooperating to limit rotation of said valve stem, said nipple and slot cooperating to limit the movement of the valve stem in one direction to a point where the opening extending through the valve disc communicates with the cylinder and in the other direction to a point wherein the said connected circumferentially-spaced openings in said valve disc communicate with said cylinder and atmosphere through said valve cap.

5. In a structure of the kind described, the combination of a tubular cylinder, a piston within said cylinder, a piston rod connected to said piston and projecting outwardly through the end of the cylinder, a rotary valve mechanism on the other end of said cylinder, ports in said valve connecting the interior of said cylinder with a source of air pressure, ports in said valve connecting the interior of said cylinder and atmosphere, a valve stem projecting axially outwardly from said valve mechanism for imparting rotary movements to said valve, a tubular handle connected to said valve stem and extending concentrically over a portion of said cylinder, a circumferential slot in said tubular handle, a tubular conduit extending through said slot connecting said pressure source to said valve, said slot and conduit cooperating to limit movements of the valve in one direction to a point whereby air from said source of pressure is admitted through said valve to the interior of said cylinder and to limit movements thereof in the opposite direction to a point where the air in said cylinder is exhausted to atmosphere through said valve, and means within said cylinder for biasing said piston toward said valve.

HAROLD W. DARR.

REFERENCES CITED

The following references are of record in the file of this patent:

UNITED STATES PATENTS

| Number | Name | Date |
|---|---|---|
| 552,798 | Trucks | Jan. 7, 1897 |
| 647,351 | Wood | Apr. 10, 1900 |
| 732,588 | Reuter | June 30, 1903 |
| 1,339,426 | Sykes | May 11, 1920 |
| 1,380,118 | Sparrow | May 31, 1921 |
| 1,645,665 | Simpson | Oct. 18, 1927 |
| 1,888,834 | Puleo | Nov. 22, 1932 |
| 2,073,510 | Bishman | Mar. 9, 1937 |
| 2,138,915 | Fuehrer | Dec. 6, 1938 |
| 2,223,915 | Lambert | Dec. 3, 1940 |
| 2,320,373 | Meyer | June 1, 1943 |